United States Patent
Narahari et al.

(10) Patent No.: US 11,968,183 B2
(45) Date of Patent: Apr. 23, 2024

(54) SYSTEMS AND METHODS FOR SELECTING AN INTERNET PROTOCOL SECURITY TUNNEL DURING AN INTERNET KEY EXCHANGE BASED ON A METRIC

(71) Applicant: Juniper Networks, Inc., Sunnyvale, CA (US)

(72) Inventors: Pradeep Kalludi Narahari, Bangalore (IN); Anand Hanumantappa Doddamani, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 49 days.

(21) Appl. No.: 17/554,435

(22) Filed: Dec. 17, 2021

(65) Prior Publication Data

US 2023/0198952 A1    Jun. 22, 2023

(51) Int. Cl.
*H04L 9/40* (2022.01)
*H04L 12/46* (2006.01)
*H04L 47/70* (2022.01)

(52) U.S. Cl.
CPC ........ *H04L 63/029* (2013.01); *H04L 12/4633* (2013.01); *H04L 63/0236* (2013.01);
(Continued)

(58) Field of Classification Search
CPC ... H04L 12/4633; H04L 63/20; H04L 63/029; H04L 63/0236; H04L 63/0435
See application file for complete search history.

(56) References Cited

U.S. PATENT DOCUMENTS 7,945,666 B2    5/2011 Wunner
2009/0031415 A1    1/2009 Aldridge et al.
(Continued)

FOREIGN PATENT DOCUMENTS

CN    113691418 A  *  11/2021
EP    3829131 A1    6/2021
(Continued)

OTHER PUBLICATIONS

"Load Balancer Tunnel Group Support for IPSec"—Oracle, Help Center, 26 Release 9.1M1 Features, Oct. 2012 https://docs.oracle.com/en/industries/communications/sd-wan-edge/9.1/featuresguide/sdwe9.1-fa-atg1.html#GUID-E5BFB6D3-7117-4CD4-AACF-59B7622BA72E (Year: 2012).*

(Continued)

*Primary Examiner* — Randy A Scott
(74) *Attorney, Agent, or Firm* — Harrity & Harrity, LLP

(57) ABSTRACT

In some implementations, a first endpoint device may assign a first metric to a first Internet Protocol security (IPsec) tunnel and a second metric to a second IPsec tunnel. The first IPsec tunnel may be a first communication channel for transmitting data between the first endpoint device and a second endpoint device, and the second IPsec tunnel may be a second communication channel for transmitting the data between the first endpoint device and the second endpoint device. The first endpoint device may select, based on the first metric and the second metric, the first IPsec tunnel or the second IPsec tunnel as a selected IPsec tunnel for transmitting the data toward the second endpoint device. The first endpoint device may transmit the data toward the second endpoint device via the selected IPsec tunnel.

20 Claims, 9 Drawing Sheets

(52) U.S. Cl.
CPC .......... *H04L 63/0435* (2013.01); *H04L 63/20* (2013.01); *H04L 47/825* (2013.01)

(56) References Cited

U.S. PATENT DOCUMENTS

| | | | |
|---|---|---|---|
| 2018/0062875 A1* | 3/2018 | Tumuluru | H04L 47/825 |
| 2018/0176255 A1* | 6/2018 | Bansal | H04L 63/20 |
| 2020/0120408 A1 | 4/2020 | Boyd et al. | |

FOREIGN PATENT DOCUMENTS

| | | | | |
|---|---|---|---|---|
| EP | 3896919 A1 * | 10/2021 | ......... | H04L 12/4633 |
| EP | 3896919 A1 | 10/2021 | | |

OTHER PUBLICATIONS

"Multiple IPSec Tunnels Between Two Endpoints"—Cisco Community, Technology and Support, Security, VPN, Aug. 21, 2018 https://community.cisco.com/t5/vpn/multiple-ipsec-tunnels-between-two-endpoints-both-of-them-with/td-p/2876766 (Year: 2018).*
Extended European Search Report for Application No. EP22156429.7, dated Jul. 27, 2022, 8 pages.

* cited by examiner

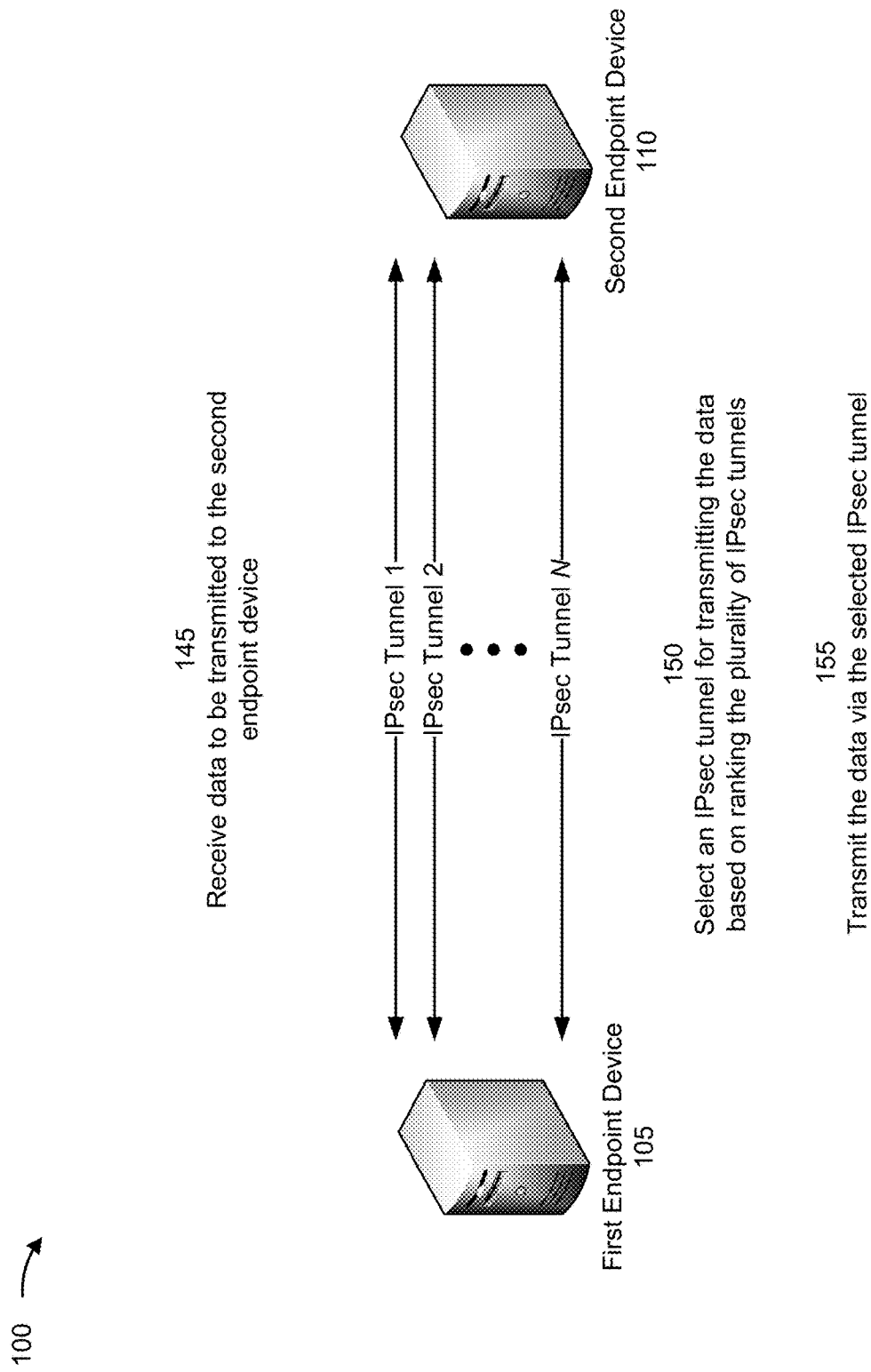

SYSTEMS AND METHODS FOR SELECTING AN INTERNET PROTOCOL SECURITY TUNNEL DURING AN INTERNET KEY EXCHANGE BASED ON A METRIC

BACKGROUND

Internet Protocol security (IPsec) is a protocol suite for secure Internet Protocol (IP) communications that works by authenticating and encrypting each IP packet of a communication session. IPsec includes protocols for establishing mutual authentication between agents at the beginning of the session and negotiation of cryptographic keys to be used during the session. IPsec can be used in protecting data flows between a pair of hosts (host-to-host), between a pair of security gateways (network-to-network), or between a security gateway and a host (network-to-host). IPsec may include an end-to-end security scheme operating in the Internet Layer of the Internet Protocol suite. IPsec may differ from other Internet security systems, such as Transport Layer Security (TLS) and Secure Shell (SSH), in that TLS and SSH may operate in upper layers at the Transport layer (TLS) and the Application layer (SSH). As such, IPsec protects all application traffic over an IP network.

SUMMARY

Some implementations described herein relate to a method. The method may include assigning, by a first endpoint device, a first metric to a first Internet Protocol security (IPsec) tunnel and a second metric to a second IPsec tunnel, wherein the first IPsec tunnel is a first communication channel for transmitting data between the first endpoint device and a second endpoint device and the second IPsec tunnel is a second communication channel for transmitting the data between the first endpoint device and the second endpoint device. The method may include selecting, by the first endpoint device and based on the first metric and the second metric, the first IPsec tunnel or the second IPsec tunnel as a selected IPsec tunnel for transmitting the data toward the second endpoint device. The method may include transmitting, by the first endpoint device, the data toward the second endpoint device via the selected IPsec tunnel.

Some implementations described herein relate to a first endpoint device. The first endpoint device may include one or more memories and one or more processors. The one or more processors may be configured to assign a first metric to a first IPsec tunnel and a second metric to a second IPsec tunnel, wherein the first IPsec tunnel is a first communication channel for transmitting data between the first endpoint device and a second endpoint device and the second IPsec tunnel is a second communication channel for transmitting the data between the first endpoint device and the second endpoint device. The one or more processors may be configured to select, based on comparing the first metric and the second metric, the first IPsec tunnel or the second IPsec tunnel as a selected IPsec tunnel for transmitting the data toward the second endpoint device. The one or more processors may be configured to transmit the data toward the second endpoint device via the selected IPsec tunnel.

Some implementations described herein relate to a non-transitory computer-readable medium that stores a set of instructions for a first endpoint device. The set of instructions, when executed by one or more processors of the first endpoint device, may cause the first endpoint device to assign a first metric to a first IPsec tunnel and a second metric to a second IPsec tunnel, wherein the first IPsec tunnel is a first communication channel for transmitting data between the first endpoint device and a second endpoint device and the second IPsec tunnel is a second communication channel for transmitting the data between the first endpoint device and the second endpoint device. The set of instructions, when executed by one or more processors of the first endpoint device, may cause the first endpoint device to select, based on comparing a first value of the first metric and a second value of the second metric, the first IPsec tunnel or the second IPsec tunnel as a selected IPsec tunnel for transmitting the data toward the second endpoint device. The set of instructions, when executed by one or more processors of the first endpoint device, may cause the first endpoint device to transmit the data toward the second endpoint device via the selected IPsec tunnel.

BRIEF DESCRIPTION OF THE DRAWINGS

FIGS. 1A-1F are diagrams of an example implementation described herein.

DETAILED DESCRIPTION

Figure 1A:
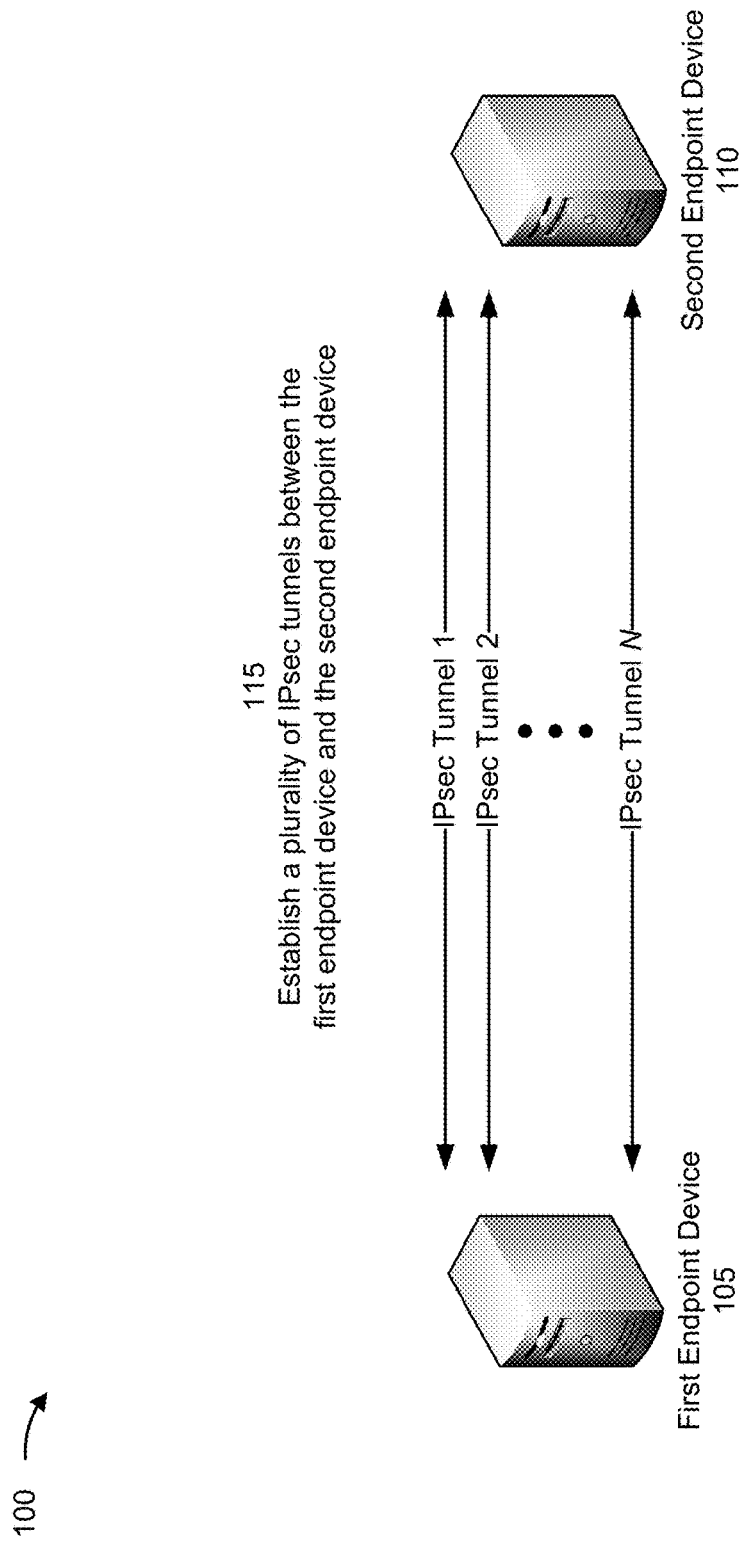

The following detailed description of example implementations refers to the accompanying drawings. The same reference numbers in different drawings may identify the same or similar elements.

In some cases, an entity (e.g., a business, a corporation, or a person, among other examples) use multiple Internet service providers (ISPs) to maintain connectivity between different locations (e.g., to maintain connectivity between offices located in different geographic regions).

Each ISP may use different network paths or different autonomous systems to maintain connectivity between the different locations. In some cases, the entity may use Internet Protocol Security (IPsec) for secure Internet Protocol (IP) communications between the different locations. For example, the entity may utilize an Internet key exchange (IKE) process to establish a first IPsec tunnel between an endpoint device (e.g., a user device, a server device, or a network device, among other examples) at a first location and an endpoint device at a second location via a network of a first ISP and a second IPsec tunnel between the endpoint device at the first location and the endpoint device at the second location via a network of a second ISP. The entity may utilize the multiple ISPs to reduce a risk of losing connectivity between the endpoint devices at the first and second locations as a result of a network outage (e.g., as a result of a failure of a network path or autonomous system). Further, a network outage may result in a time delay from the detection of the network outage until a new IPsec tunnel is established, which may result in traffic loss during the time delay. Therefore, instead of having a single IPsec tunnel following one path in the network, the entity may have two or more IPsec tunnels between the endpoint devices. Each IPsec tunnel may follow a different network path and may be supported by a different ISP for redundancy. Therefore, each tunnel would be following different path to the peer.

As an example, a network outage associated with the first ISP may result in a failure of the IPsec tunnel between two endpoint devices via the network of the first ISP. The endpoint devices may utilize dead-peer-detection (DPD) or any other similar methods to detect the network outage. Based on detecting the network outage, an endpoint device may bring down the IPsec tunnel established via the network of the first ISP and may try to re-negotiate for a new IPsec tunnel. For example, the endpoint device may re-negotiate for a new IPsec tunnel using a path to the other endpoint device that bypasses a failed network path or utilizes a network of another ISP.

However, an endpoint device may not be able to choose between the different IPsec tunnels for transmitting traffic to the other endpoint device. For example, if a first IPsec tunnel established via a network of a first ISP has a better quality of service (QoS) relative to other IPsec tunnels established between the endpoint devices, it may be beneficial for the first IP sec tunnel to be selected for transmitting traffic between the endpoint devices until there is a breakage in the service or depreciation in the QoS. If there is a breakage in the service or a depreciation in the QoS, the endpoint devices should utilize a second IPsec tunnel established via a network of a second ISP based on the second IPsec tunnel having a better QoS relative to the remaining IPsec tunnels. However, when static routing is used, there is no mechanism available to select/switch between the IPSec tunnels for traffic being transmitted to a same destination (e.g., between the same endpoint devices).

Some implementations described herein enable an endpoint device to select an IPsec tunnel, from a plurality of IPsec tunnels established between the endpoint device and another endpoint device, for transmitting traffic to the other endpoint device. In some implementations, a respective metric value may be negotiated by the endpoint device and the other endpoint device for each IPsec tunnel, and the endpoint device may select the IPSec tunnel based on the respective metric value negotiated for the IPsec tunnel. In some implementations, the metric value for an IPsec tunnel may indicate a QoS associated with the IPsec tunnel, and the endpoint device may select the IPsec tunnel based on the IPsec tunnel being associated with a metric representing a better QoS relative to the QoS of the other IPsec tunnels. In this way, the endpoint device may optimize the communication of traffic transmitted between the endpoint device and the other endpoint device, which may result in conserving computing resources (e.g., processing resources, memory resources, or communication resources, among other examples) relative to computing resources utilized to communicate traffic between the endpoint device and the other endpoint device via an IPsec tunnel having a lower QoS.

FIGS. 1A-1F are diagrams of an example implementation 100 associated with selecting an IPsec tunnel during an IKE based on a metric. As shown in FIGS. 1A-1F, example implementation 100 includes a first endpoint device 105 and a second endpoint device 110. These devices are described in more detail below in connection with FIG. 2 and FIG. 3.

As shown in FIG. 1A, and by reference number 115, the first endpoint device 105 may establish a plurality of IPsec tunnels between the first endpoint device 105 and the second endpoint device 110. For example, the first endpoint device 105 may establish a plurality of IPsec tunnels (e.g., N IPsec tunnels, where N is an integer number greater than 2, as shown in FIG. 1A) for communicating traffic between the first endpoint device 105 and the second endpoint device 110.

In some implementations, the plurality of IPsec tunnels may be established via one or more networks associated with one or more ISPs. For example, a first IPsec tunnel (e.g., IPsec tunnel 1, as shown) may be established via a network of a first ISP, a second IPsec tunnel (e.g., IPsec tunnel 2, as shown) may be established via a network of a second ISP, and a third IPsec tunnel (e.g., IPsec tunnel N, as shown) may be established via a network of a third ISP.

In some implementations, the first ISP may be the same as, or different from, the second ISP. In some implementations, the third ISP may be the same as, or different from, the first ISP and/or the second ISP.

In some implementations, each IPsec tunnel, of the plurality of IPsec tunnels, may comprise a different network path between the first endpoint device 105 and the second endpoint device 110 relative to other IPsec tunnels of the plurality of IPsec tunnels. For example, the first IPsec tunnel may comprise a first network path between the first endpoint device 105 and the second endpoint device 110, and the second IPsec tunnel may comprise a second network path between the first endpoint device 105 and the second endpoint device 110 that is different from the first network path (e.g., traffic transmitted via the second network path is transmitted via one or more network devices that are not included on the first network path).

Figure 1B:
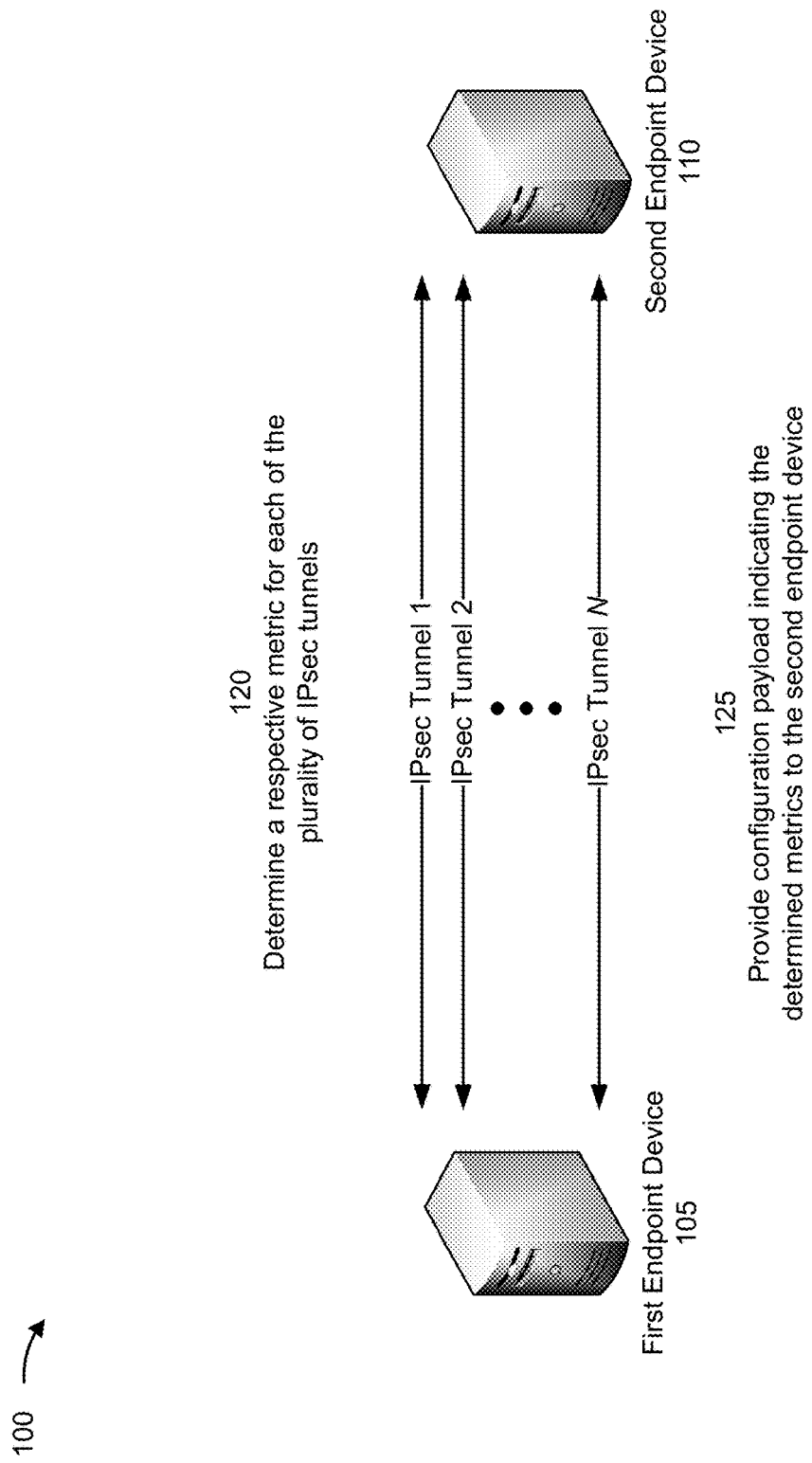

As shown in FIG. 1B, and by reference number 120, the first endpoint device 105 may determine a respective metric associated with each IPsec tunnel of the plurality of IPsec tunnels. The metric may indicate a preference for transmitting traffic via the IPsec tunnel relative to transmitting the traffic via other IPsec tunnels, of the plurality of IPsec tunnels.

In some implementations, the metric indicates a QoS associated with the IPsec tunnel. In some implementations, the QoS may be a QoS indicated by a service level agreement between an entity associated with the first endpoint device 105 and an ISP associated with a network via which the IPsec tunnel is established. For example, the first endpoint device 105 may receive information indicating a QoS indicated by the service level agreement from another device (e.g., a client device, a server device, or a network device, among other examples, associated with the first endpoint device 105), from a memory of the first endpoint device 105, or via a user input, among other examples.

In some implementations, the QoS is a QoS determined by the first endpoint device. For example, the first endpoint device 105 may determine a bandwidth, a latency, a jitter, and/or a quantity of network devices included along a network path comprising the IPsec tunnel, among other examples. The first endpoint device 105 may determine the QoS based on the bandwidth, the latency, the jitter, and/or the quantity of network devices. The first endpoint device 105 may determine the metric based on the determined QoS.

In some implementations, the metric indicates a weight associated with the IPsec tunnel. In some implementations, the weight may indicate a priority associated with the IPsec tunnel. In some implementations, the weight may indicate a particular percentage of all traffic transmitted to the second endpoint device 110 (e.g., 70%, 80%, or 90%, among other examples, of all traffic transmitted to the second endpoint device 110) is to be transmitted via the IPsec tunnel.

In some implementations, the weight may be determined based on one or more characteristics associated with the IPsec tunnel. For example, the weight may be determined based on a QoS associated with the IPsec tunnel, a bandwidth associated with the IPsec tunnel, a latency associated with the IPsec tunnel, or a jitter associated with the IPsec tunnel, among other examples.

In some implementations, the metric is a user configured metric. For example, a user may input information indicating a QoS indicated by a service level agreement, a weight or a percentage of traffic to be transmitted via the IPsec tunnel, and/or a metric indicating a priority of the IPsec tunnel relative to the other IPsec tunnels, among other examples.

As shown by reference number 125, the first endpoint device 105 may provide a configuration payload indicating the determined metrics to the second endpoint device 110. In some implementations, the first endpoint device 105 may provide a configuration payload indicating the respective metric determined for each IPsec tunnel.

In some implementations, the first endpoint device 105 may provide a separate configuration payload for each of the plurality of IPsec tunnels. In some implementations, each separate configuration payload, for each of the plurality of IPsec tunnels, may indicate the metric determined for the IPsec tunnel indicated by the configuration payload.

In some implementations, the first endpoint device 105 may provide the configuration payload as part of a process for negotiating a metric associated with the IPsec tunnel. In some implementations, the first endpoint device 105 may provide the configuration payload to negotiate the metric during a process for establishing the IPsec tunnel between the first endpoint device 105 and the second endpoint device 110. For example, during a process for establishing the IPsec tunnel between the first endpoint device 105 and the second endpoint device 110, the first endpoint device 105 may transmit a request message indicating the metric determined for the IPsec tunnel.

In some implementations, the first endpoint device 105 may provide the configuration payload after the initial exchanges as part of INFORMATIONAL exchange. In some implementations, the first endpoint device 105 may provide the configuration payload to negotiate the metric after the process for establishing the IPsec tunnel between the first endpoint device 105 and the second endpoint device 110. For example, after the process for establishing the IPsec tunnel between the first endpoint device 105 and the second endpoint device 110, the first endpoint device 105 may transmit a INFORMATIONATIONAL exchange request message indicating the metric determined for the IPsec tunnel.

In some implementations, the configuration payload includes a new configuration payload type for an IKE exchange message (e.g., a configuration payload type associated with an IKE_AUTH or CREATE_CHILD_SA or INFORMATIONAL exchange message). In some implementations, a form of the configuration payload may correspond to: CP(CFG_SET)=IPSEC_TUNNEL_METRIC(x),
where x is the metric determined for the IPsec tunnel. In some implementations, "CFG_SET" and "CFG_ACK" may allow the first endpoint device 105 to exchange the metric value. In some implementations, the attribute types "IPSEC_TUNNEL_METRIC" may comprise IKEv2 configuration payload attribute types. In some implementations, the attribute types "IPSEC_TUNNEL_METRIC" may have pre-configured attribute values. For example, the attribute types "IPSEC_TUNNEL_METRIC" may have attribute values defined by user input or an applicable communications standard, among other examples.

In some implementations, the second endpoint device 110 may receive the configuration payload and may generate a response to the configuration payload. The response to the configuration payload may indicate an acceptance of the metric indicated in the configuration payload, a rejection of the metric indicated in the configuration payload, and/or a new metric for the IPsec tunnel indicated in the configuration payload.

In some implementations, the second endpoint device 110 may determine a metric associated with the IPsec tunnel indicated in the configuration payload. In some implementations, the second endpoint device 110 may determine the metric associated with the IPsec tunnel indicated in the configuration payload in a manner similar to that described above. The second endpoint device 110 may compare the metric indicated in the configuration payload and the metric determined by the second endpoint device 110. The second endpoint device 110 may select one of the metrics indicated in the configuration payload or the metric determined by the second endpoint device 110 based on the comparison. The second endpoint device 110 may generate a response to the configuration payload that indicates the selected metric.

As an example, the second endpoint device 110 may compare the metric indicated in the configuration payload and the metric determined by the second endpoint device 110. The second endpoint device 110 may determine whether the metric determined by the second endpoint device 110 is less than (or greater than) the metric indicated in the configuration payload based on the comparison. The second endpoint device 110 may generate a response indicating the metric determined by the second endpoint device 110 when the metric determined by the second endpoint device 110 is less than (or greater than) the metric indicated in the configuration payload. The second endpoint device 110 may generate a response indicating the metric indicated in the response when the metric determined by the second endpoint device 110 is greater than (or less than) the metric indicated in the configuration payload.

In some implementations, the first endpoint device 105 may not send a configuration payload indicating the metric determined for an IPsec tunnel. For example, the first endpoint device 105 and the second endpoint device 110 may determine the metric for an IPsec tunnel based on user input. In some implementations, the user input may indicate that the second endpoint device 110 determined the metric for the IPsec tunnel based on user input, and the first endpoint device 105 may not provide the configuration payload to the second endpoint device 110 based on the second endpoint device 110 determining the metric for the IPsec tunnel based on user input.

Figure 1C:
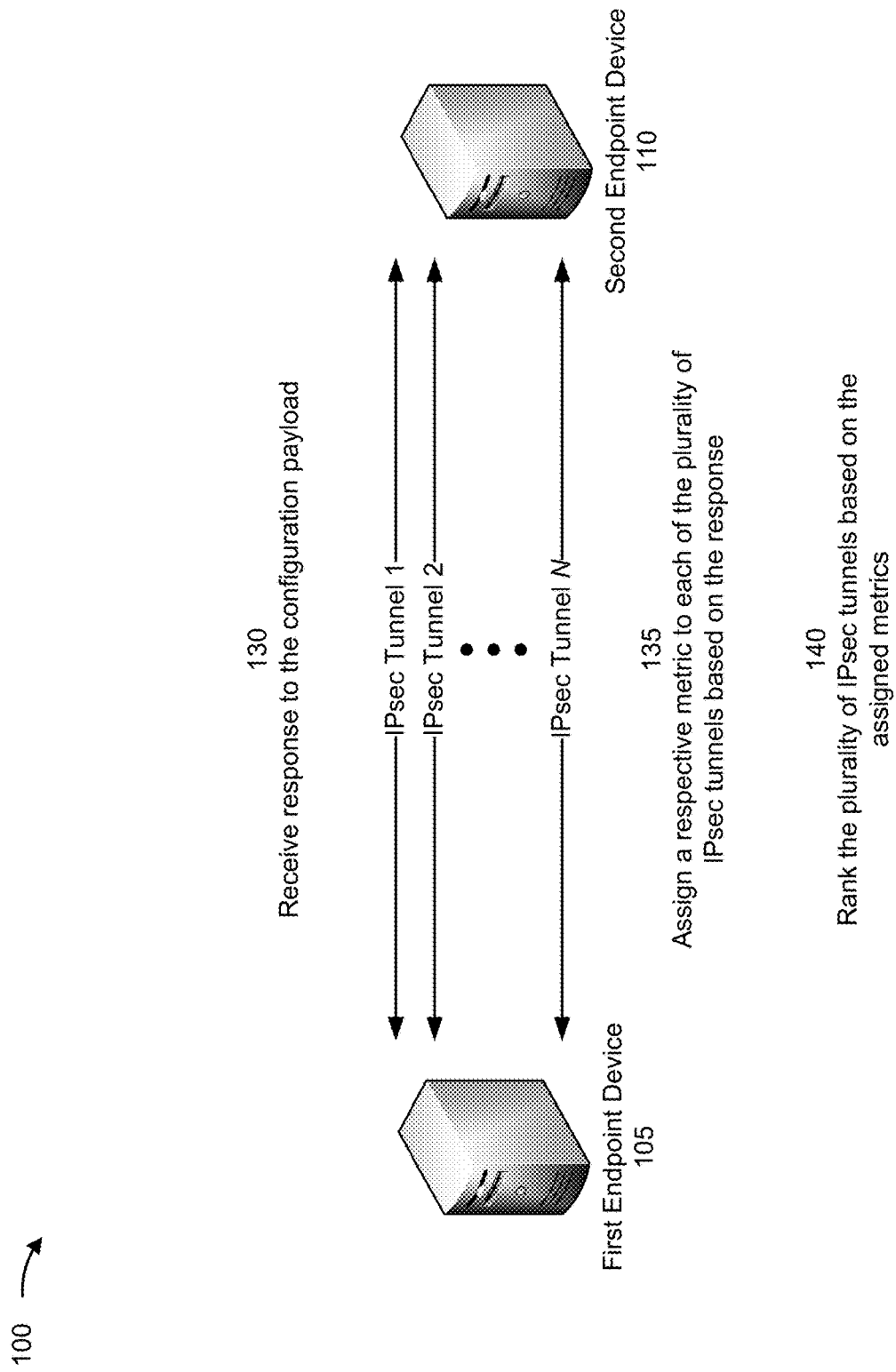

As shown in FIG. 1C, and by reference number 130, the first endpoint device 105 may receive a response to the configuration payload from the second endpoint device 110. In some implementations, the response may be associated with a single IPsec tunnel and may indicate an acceptance of the metric determined by the first endpoint device 105 for the IPsec tunnel, a rejection of the metric determined by the first endpoint device 105 for the IPsec tunnel, and/or a new metric for the IPsec tunnel.

In some implementations, the first endpoint device 105 may receive a separate response for each IPsec tunnel for which a configuration payload was transmitted. Each separate response may indicate an acceptance of the metric determined by the first endpoint device 105, a rejection of the metric determined by the first endpoint device 105, and/or a new metric for each IPsec tunnel for which a configuration payload was transmitted to the second endpoint device 110.

As shown by reference number 135, the first endpoint device 105 may assign a respective metric to each IPsec tunnel, of the plurality of IPsec tunnels, based on the response. In some implementations, the response may indicate an acceptance of a metric determined by the first endpoint device 105 for an IPsec tunnel. The first endpoint device 105 may assign the metric determined by the first endpoint device 105 to the IPsec tunnel based on the response indicating the acceptance of the metric.

In some implementations, the response may indicate a rejection of a metric determined by the first endpoint device 105 for an IPsec tunnel. The first endpoint device 105 may assign a metric other than the metric determined by the first endpoint device 105 for the IPsec tunnel based on the response indicating the rejection of the metric.

In some implementations, the first endpoint device 105 determines a new metric for the IPsec tunnel and assigns the new metric to the IPsec tunnel based on the response indicating the rejection of the metric. For example, the first endpoint device 105 may determine a new metric for the IPsec tunnel, may transmit a new configuration payload indicating the new metric to the second endpoint device 110, and/or may receive a new response to the new configuration payload in a manner similar to that described above. The new response may indicate an acceptance of the new metric, and the first endpoint device 105 may assign the new metric to the IPsec tunnel based on the response indicating the acceptance of the new metric.

In some implementations, the response indicates a metric determined by the second endpoint device 110. The metric determined by the second endpoint device 110 may be the same as, or different from, the metric determined by the first endpoint device 105 for the IPsec tunnel. The first endpoint device 105 may assign the metric indicated in the response to the IPsec tunnel based on the metric being indicated in the response.

As shown by reference number 140, the first endpoint device 105 may rank (e.g., prioritize) the plurality of IPsec tunnels based on the respective metric assigned to each IPsec tunnel. For example, the first endpoint device 105 may identify an IPsec tunnel assigned a lowest (or highest) metric relative to the metrics assigned to the other IPsec tunnels of the plurality of IPsec tunnels. The first endpoint device 105 may rank the IPsec tunnel first (e.g., associate the IPsec tunnel with a highest ranking) based on the IPsec tunnel being assigned the lowest (or highest) metric relative to the metrics assigned to the other IPsec tunnels. The first endpoint device 105 may rank the remaining IPsec tunnels based on the respective metrics assigned to the remaining IPsec tunnels in a similar manner to generate a ranked list of IPsec tunnels.

As shown in FIG. 1D, and by reference number 145, the first endpoint device 105 may receive data to be transmitted to the second endpoint device 110. For example, the first endpoint device 105 may receive a request to access a server device associated with the second endpoint device 110 from a client device.

As shown by reference number reference number 150, the first endpoint device 105 may select an IPsec tunnel, from the plurality of IPsec tunnels, based on ranking the plurality of IPsec tunnels. For example, the first endpoint device 105 may select an IPsec tunnel associated with a highest ranking relative to the other IPsec tunnels based on the ranked list of IPsec tunnels generated by the first endpoint device 105. As shown by reference number 155, the first endpoint device 105 may transmit the data to the second endpoint device 110 via the selected IPsec tunnel.

Figure 1E:
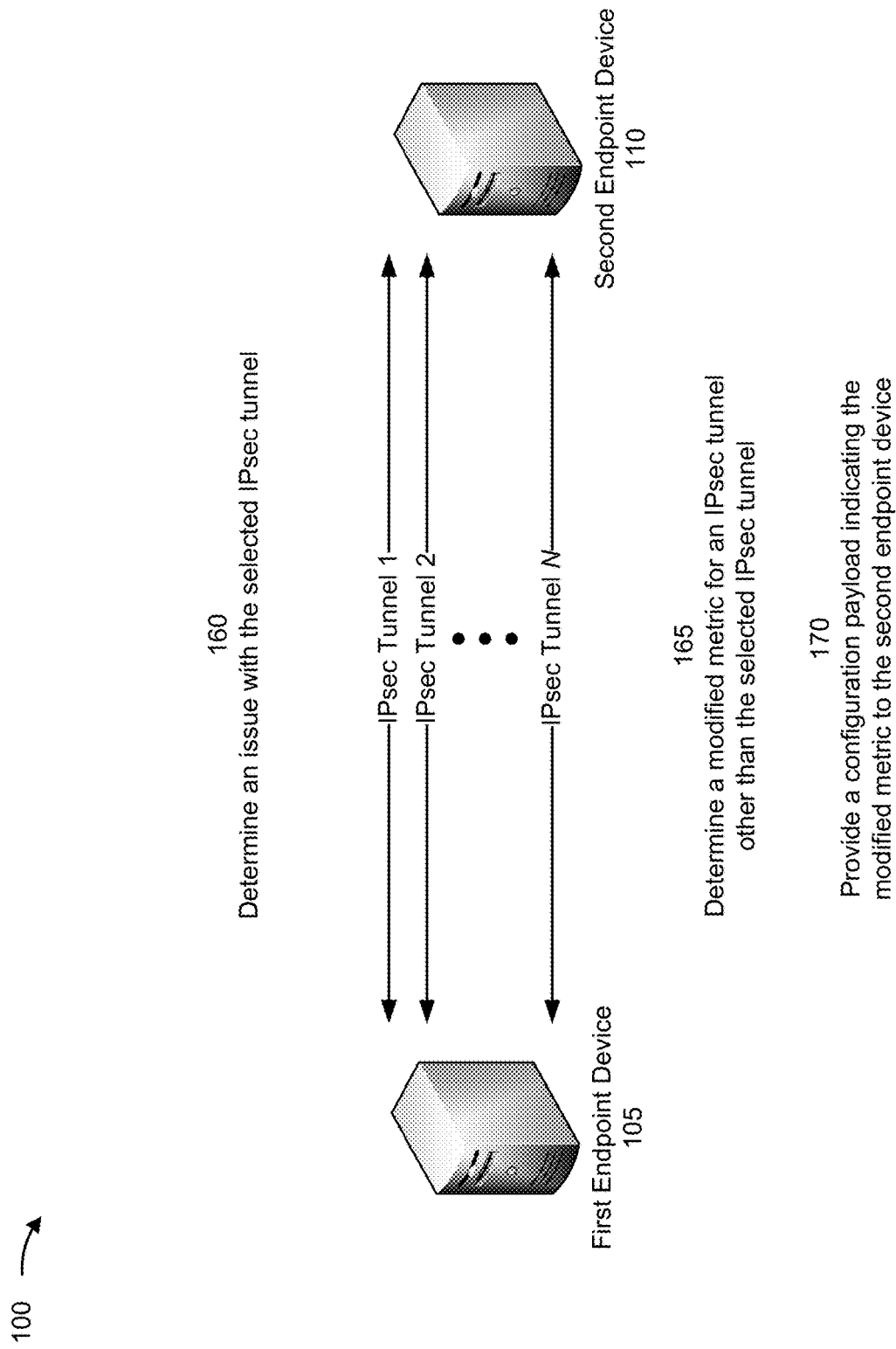

As shown in FIG. 1E, and by reference number 160, the first endpoint device 105 may determine an issue associated with the selected IPsec tunnel. For example, after transmitting the data to the second endpoint device 110, the first endpoint device 105 may determine a network outage associated with a network via which the selected IPsec tunnel was established, a degradation of a QoS associated with the selected IPsec tunnel, or a failure of a network device associated with the IPsec tunnel, among other examples.

As shown by reference number 165, the first endpoint device 105 may determine a modified metric associated with another IPsec tunnel other than the selected IPsec tunnel, based on the issue associated with the selected IPsec tunnel. In some implementations, the first endpoint device 105 may determine the modified metric in a manner similar to that described above with respect to the first endpoint device 105 determining the metric for the IPsec tunnel.

As shown by reference number 170, the first endpoint device 105 may provide a configuration payload indicating the modified metric associated with the other IPsec tunnel to the second endpoint device 110. In some implementations, the configuration payload may indicate that the modified metric is less than (or greater than) a metric determined for another IPsec tunnel, of the plurality of IPsec tunnels. In some implementations, the configuration payload indicating the modified metric may be included in IKE INFORMATIONAL exchange message. In some implementations, the first endpoint device 105 may provide the configuration payload indicating the modified metric to the second endpoint device 110 in a manner similar to that described above. In some implementations, the first endpoint device 105 may receive a response to the configuration payload indicating the modified metric from the second endpoint device 110. In some implementations, the response may indicate an acceptance of the modified metric, a rejection of the modified metric, and/or a new modified metric for the IPsec tunnel. The first endpoint device 105 may assign the modified metric or a new modified metric to the other IPsec tunnel based on the response. In some implementations, the first endpoint device 105 may assign the modified metric or the new modified metric to the other IPsec tunnel in a manner similar to that described above.

Figure 1F:
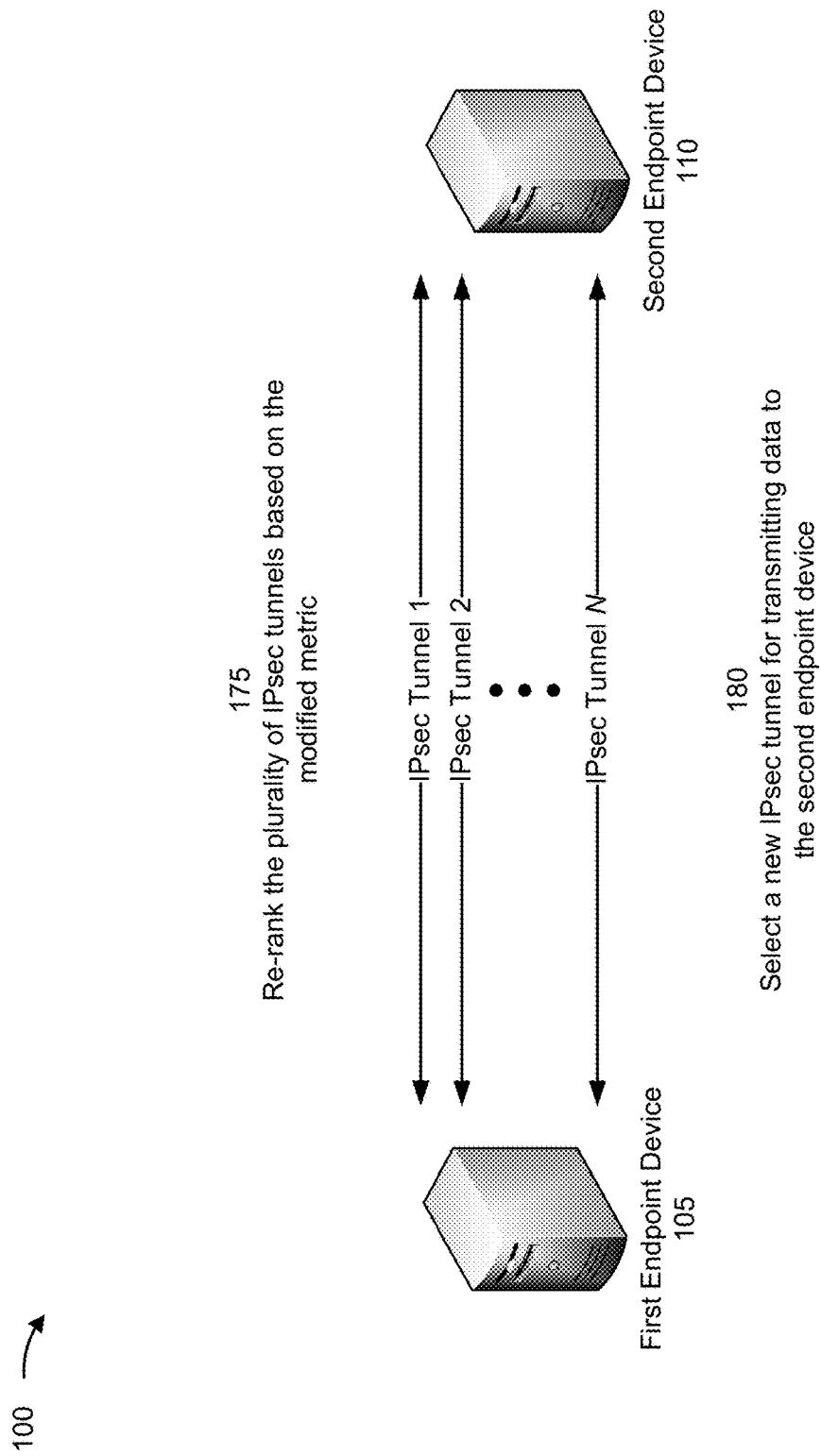

As shown in FIG. 1F, and by reference number 175, the first endpoint device 105 may re-rank the plurality of IPsec tunnels based on the modified metric associated with the other IPsec tunnel other than the selected IPsec tunnel. For example, the first endpoint device 105 may generate a new ranked list of IPsec tunnels based on assigning the modified metric or the new modified metric to the other IPsec tunnel. In some implementations, the first endpoint device 105 may generate the new ranked list of IPsec tunnels in a manner similar to that described above.

As shown by reference number 180, the first endpoint device 105 may select, based on re-ranking the plurality of IPsec tunnels, a new IPsec tunnel, from the plurality of IPsec tunnels, for transmitting traffic between the first endpoint device 105 and the second endpoint device 110. For example, the first endpoint device 105 may receive new data to be transmitted to the second endpoint device 110. The first endpoint device 105 may select a highest-ranking IPsec tunnel, of the plurality of IPsec tunnels, based on the new ranked list of IPsec tunnels. In some implementations, the first endpoint device 105 may select the highest-ranking IPsec tunnel based on the new ranked list of IPsec tunnels in a manner similar to that described above. The first endpoint device 105 may transmit the new data to the second endpoint device 110 via the selected IPsec tunnel.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
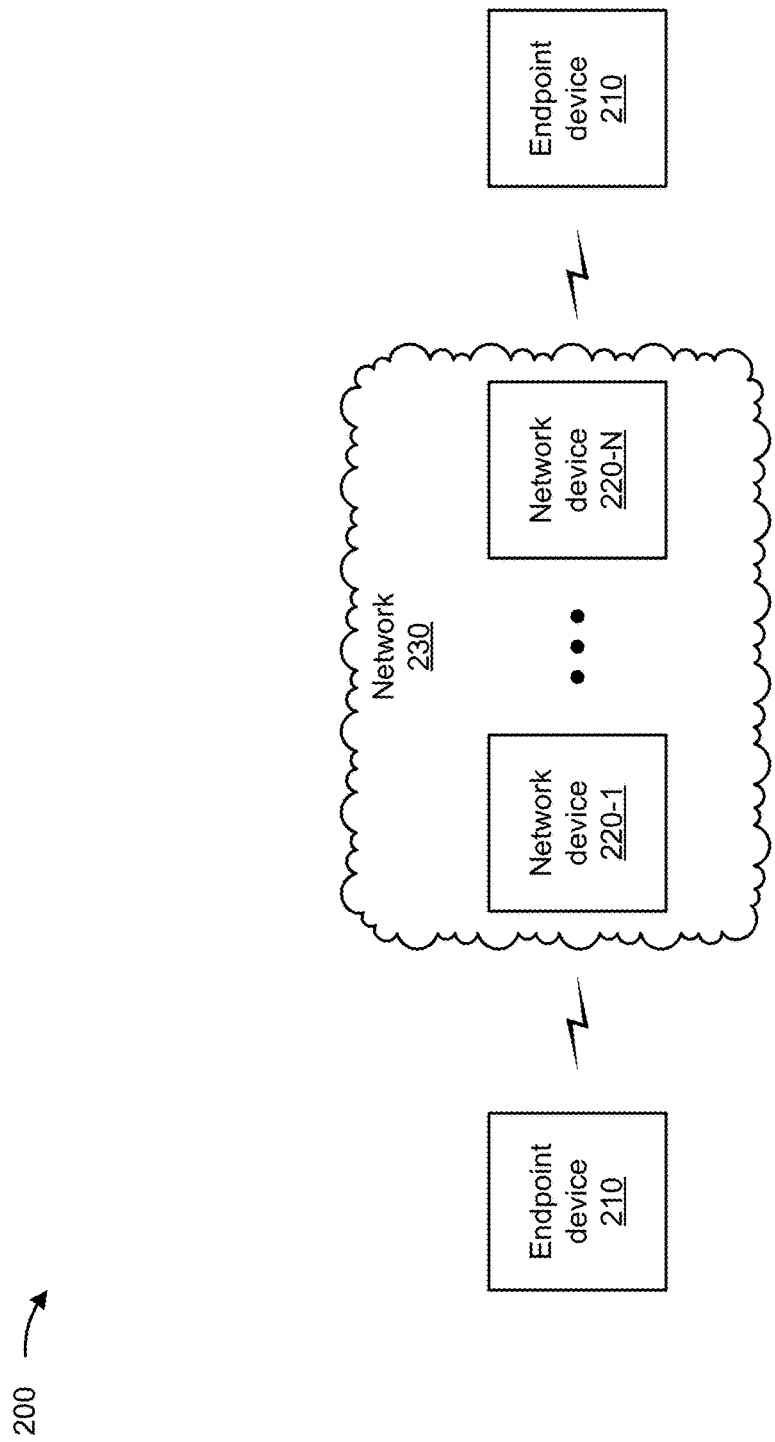
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), and a network 230. Devices of environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210 via network 230 (e.g., by routing packets using network devices 220 as intermediaries). In some implementations, the endpoint device 210 may correspond to the first endpoint device 105 and/or the second endpoint device 110.

In some implementations, the endpoint device 210 includes a server device. The server device may include one or more devices capable of receiving, generating, storing, processing, and/or providing information, such as information described herein. For example, the server device may include a laptop computer, a tablet computer, a desktop computer, a group of server devices, or a similar type of device, associated with multicast traffic. In some implementations, the server device may receive information from and/or transmit information (e.g., multicast traffic) to an endpoint device 210, via network 230 (e.g., by routing packets using network devices 220 as intermediaries). In some implementations, the endpoint device 210 includes a network device 220.

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through network 230.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like), and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
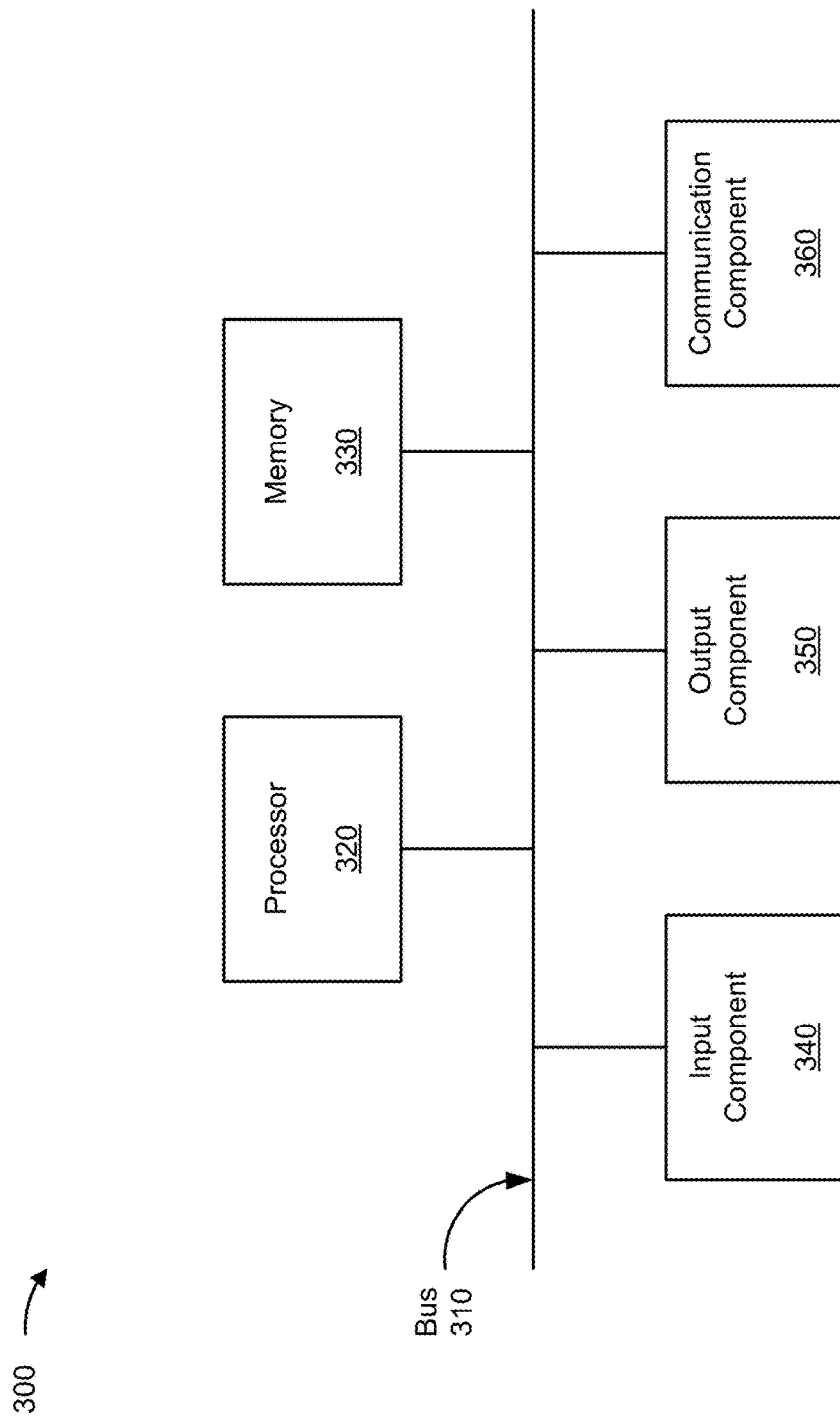
FIG. 3 is a diagram of example components of one or more devices of FIG. 2.

FIG. 3 is a diagram of example components of a device 300, which may correspond to endpoint device 210 and/or network device 220. In some implementations, the endpoint device 210 and/or the network device 220 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium.

Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
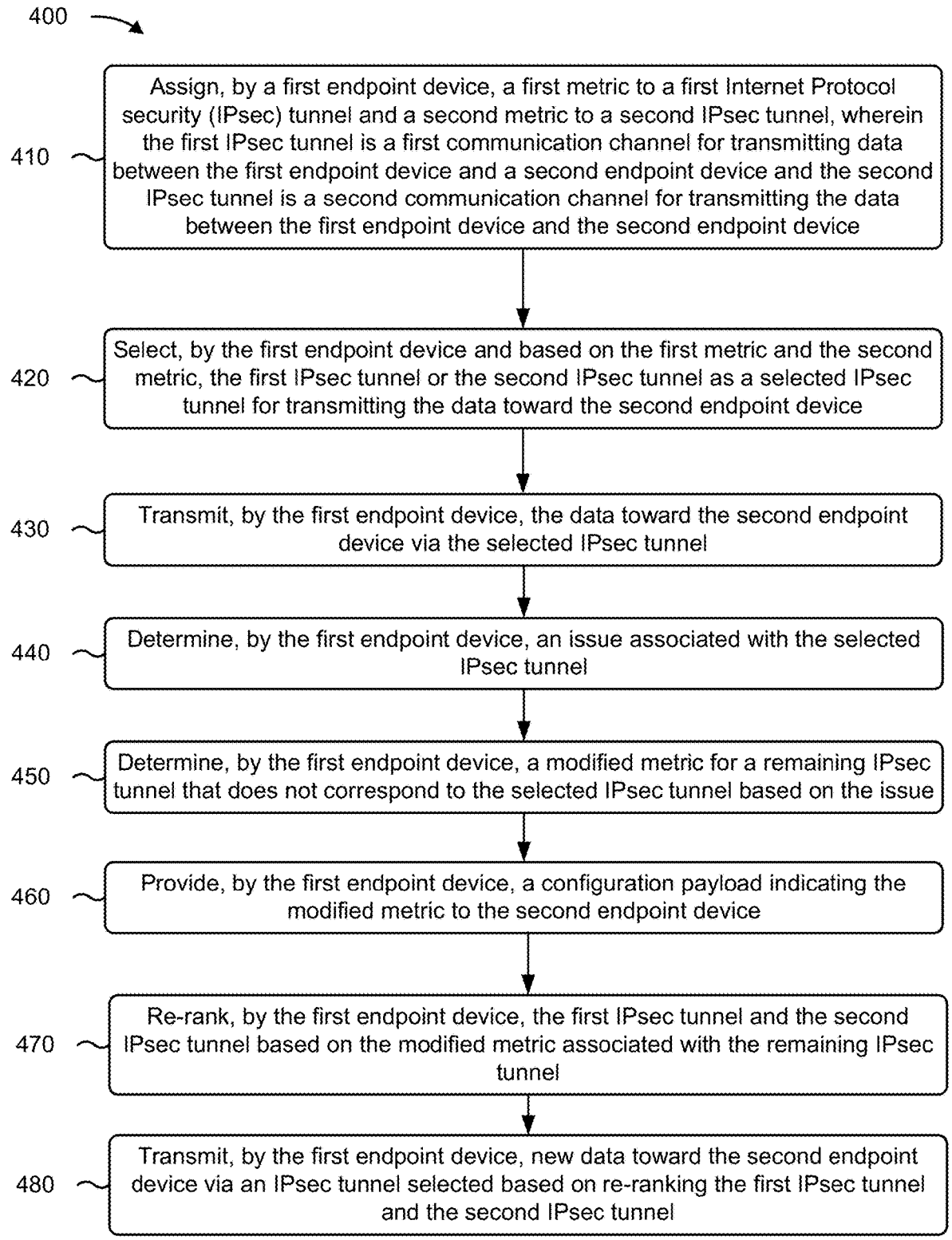
FIG. 4 is a flowchart of an example process relating to selecting an Internet Protocol security (IPsec) tunnel during an Internet key exchange (IKE) based on a metric.

FIG. 4 is a flowchart of an example process 400 associated with systems and methods for selecting an IPsec tunnel during an IKE based on a metric. In some implementations, one or more process blocks of FIG. 4 are performed by a first endpoint device (e.g., the first endpoint device 105). In some implementations, one or more process blocks of FIG. 4 are performed by another device or a group of devices separate from or including the first endpoint device, such as another endpoint device (e.g., the second endpoint device 110) and/or a network device (e.g., the network device 220). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include assigning a first metric to a first IPsec tunnel and a second metric to a second IPsec tunnel, wherein the first IPsec tunnel is a first communication channel for transmitting data between the first endpoint device and a second endpoint device and the second IPsec tunnel is a second communication channel for transmitting the data between the first endpoint device and the second endpoint device (block 410). For example, the first endpoint device may assign a first metric to a first IPsec tunnel and a second metric to a second IPsec tunnel, wherein the first IPsec tunnel is a first communication channel for transmitting data between the first endpoint device and a second endpoint device and the second IPsec tunnel is a second communication channel for transmitting the data between the first endpoint device and the second endpoint device, as described above.

As further shown in FIG. 4, process 400 may include selecting, based on the first metric and the second metric, the first IPsec tunnel or the second IPsec tunnel as a selected IPsec tunnel for transmitting the data toward the second endpoint device (block 420). For example, the first endpoint device may select, based on the first metric and the second metric, the first IPsec tunnel or the second IPsec tunnel as a selected IPsec tunnel for transmitting the data toward the second endpoint device, as described above.

As further shown in FIG. 4, process 400 may include transmitting the data toward the second endpoint device via the selected IPsec tunnel (block 430). For example, the first endpoint device may transmit the data toward the second endpoint device via the selected IPsec tunnel, as described above.

As further shown in FIG. 4, process 400 may include determining an issue associated with the selected IPsec tunnel (block 440). For example, the first endpoint device may determine an issue associated with the selected IPsec tunnel, as described above.

As further shown in FIG. 4, process 400 may include determining a modified metric for a remaining IPsec tunnel that does not correspond to the selected IPsec tunnel based on the issue (block 450). For example, the first endpoint device may determine a modified metric for a remaining IPsec tunnel that does not correspond to the selected IPsec tunnel based on the issue, as described above.

As further shown in FIG. 4, process 400 may include providing a configuration payload indicating the modified metric to the second endpoint device (block 460). For example, the first endpoint device may provide a configuration payload indicating the modified metric to the second endpoint device, as described above. The second endpoint device may provide a response indicating an acceptance of the modified metric, a rejection of the modified metric, and/or a new modified metric for the IPsec tunnel. The first endpoint device may assign the modified metric or the new modified metric to the IPsec tunnel.

As further shown in FIG. 4, process 400 may include re-ranking the first IPsec tunnel and the second IPsec tunnel based on the modified metric associated with the remaining IPsec tunnel (block 470). For example, the first endpoint device may select the highest-ranking IPsec tunnel based on re-ranking the first IPsec tunnel or the second IPsec tunnel.

As further shown in FIG. 4, process 400 may include transmitting the new data toward the second endpoint device via the selected IPsec tunnel (block 480). For example, the first endpoint device may transmit the new data to the second endpoint device via the selected IPsec tunnel.

Process 400 may include additional implementations, such as any single implementation or any combination of implementations described below and/or in connection with one or more other processes described elsewhere herein.

In a first implementation, the first endpoint device selects the first IPsec tunnel or the second IPsec tunnel as the new selected IPsec tunnel for transmitting data toward the second endpoint device, the method further comprising selecting, based on the modified metric associated with the first IPsec tunnel or the second IPsec tunnel.

In a second implementation, alone or in combination with the first implementation, the configuration payload is comprised in an IKE INFORMATIONAL exchange message.

In a third implementation, alone or in combination with one or more of the first and second implementations, assigning the first metric to the first IPsec tunnel and the second metric to the second IPsec tunnel comprises determining a first quality of service associated with the first IPsec tunnel, assigning the first metric to the first IPsec tunnel based on the first quality of service, determining a second quality of service associated with the second IPsec tunnel, assigning the second metric to the second IPsec tunnel based on the second quality of service, and transmitting a configuration payload indicating the first metric and the second metric to the second endpoint device.

In a fourth implementation, alone or in combination with one or more of the first through third implementations, the first metric comprises a first weight and the second metric comprises a second weight, the method further comprising transmitting, via the first IPsec tunnel, a first percentage of the data toward the second endpoint device, wherein the first percentage is determined based on the first weight, and transmitting, via the second IPsec tunnel, a second percentage of the data toward the second endpoint device, wherein the second percentage is based on the second weight.

In a fifth implementation, alone or in combination with one or more of the first through fourth implementations, process 400 includes determining the first weight based on a first bandwidth associated with the first IPsec tunnel, and determining the second weight based on a second bandwidth associated with the second IPsec tunnel.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
assigning, by a first endpoint device, a first metric to a first Internet Protocol security (IPsec) tunnel and a second metric to a second IPsec tunnel,
wherein the first IPsec tunnel is a first communication channel for transmitting data between the first endpoint device and a second endpoint device and the second IPsec tunnel is a second communication channel for transmitting the data between the first endpoint device and the second endpoint device wherein the first IPsec tunnel is a first communication channel for transmitting data between the first endpoint device and a second endpoint device and the second IPsec tunnel is a second communication channel for transmitting the data between the first endpoint device and the second endpoint device, and
wherein the first IPsec tunnel and the second IPsec tunnel are from a plurality of IPsec tunnels between the first endpoint device and the second endpoint device;
ranking, by the first endpoint device and according to the first metric and the second metric, the plurality of IPsec tunnels;
selecting, by the first endpoint device and according to the ranking, the first IPsec tunnel or the second IPsec tunnel as a selected IPsec tunnel for transmitting the data toward the second endpoint device;

modifying, by the first endpoint device and upon determining an issue associated with the first IPsec tunnel, the second metric to generate a modified second metric;

re-ranking, by the first endpoint device and according to the modified second metric, the plurality of IPsec tunnels;

selecting, by the first endpoint device and in response to the re-ranking, a particular IPsec tunnel of the plurality of IPsec tunnels; and transmitting, by the first endpoint device, the data toward the second endpoint device via the particular IPsec tunnel.

2. The method of claim 1, wherein the first endpoint device selects the first IPsec tunnel as the selected IPsec tunnel, and wherein the method further comprises:

modifying, based on an issue associated with the first IPsec tunnel, the second metric to generate a modified second metric;

selecting, based on the first metric and the modified second metric, the first IPsec tunnel or the second IPsec tunnel as a new selected IPsec tunnel for transmitting data toward the second endpoint device; and transmitting a configuration payload indicating the modified second metric to the second endpoint device.

3. The method of claim 2, wherein the configuration payload comprises an Internet Key Exchange configuration payload.

4. The method of claim 1, wherein assigning the first metric to the first IPsec tunnel and the second metric to the second IPsec tunnel comprises:

determining a first quality of service associated with the first IPsec tunnel;

assigning the first metric to the first IPsec tunnel based on the first quality of service;

determining a second quality of service associated with the second IPsec tunnel;

assigning the second metric to the second IPsec tunnel based on the second quality of service; and transmitting, to the second endpoint device, a first configuration payload for the first IPsec tunnel and indicating the first metric and a second configuration payload for the second IPsec tunnel and indicating the second metric.

5. The method of claim 1, wherein the first metric comprises a first weight and the second metric comprises a second weight, the method further comprising:

transmitting, via the first IPsec tunnel, a first percentage of the data toward the second endpoint device, wherein the first percentage is determined based on the first weight; and transmitting, via the second IPsec tunnel, a second percentage of the data toward the second endpoint device, wherein the second percentage is based on the second weight.

6. The method of claim 5, further comprising:

determining the first weight based on a first bandwidth associated with the first IPsec tunnel; and determining the second weight based on a second bandwidth associated with the second IPsec tunnel.

7. A first endpoint device, comprising:
one or more memories; and
one or more processors to:

assign a first metric to a first Internet Protocol security (IPsec) tunnel and a second metric to a second IPsec tunnel, wherein the first IPsec tunnel is a first communication channel for transmitting data between the first endpoint device and a second endpoint device and the second IPsec tunnel is a second communication channel for transmitting the data between the first endpoint device and the second endpoint device, and wherein the first IPsec tunnel and the second IPsec tunnel are from a plurality of IPsec tunnels between the first endpoint device and the second endpoint device;

rank, in response to comparing the first metric and the second metric, the plurality of IPsec tunnels the first IPsec tunnel and the second IPsec tunnel;

select, according to the ranking, the first IPsec tunnel or the second IPsec tunnel as a selected IPsec tunnel for transmitting the data toward the second endpoint device;

modify, upon determining an issue associated with the first IPsec tunnel, the second metric to generate a modified second metric;

re-rank, according to the modified second metric, the plurality of IPsec tunnels;

select, in response to the re-ranking, a particular IPsec tunnel of the plurality of IPsec tunnels; and transmit the data toward the second endpoint device via the particular IPsec tunnel.

8. The first endpoint device of claim 7, wherein the first endpoint device selects the first IPsec tunnel as the selected IPsec tunnel, and wherein the one or more processors are further to:

determine an issue associated with the first IPsec tunnel;

modify, based on the issue associated with the first IPsec tunnel, the second metric to generate a modified second metric; and select, based on comparing the first metric and the second metric, the first IPsec tunnel or the second IPsec tunnel as a new selected IPsec tunnel for transmitting data toward the second endpoint device.

9. The first endpoint device of claim 7, wherein the one or more processors, to assign the first metric to the first IPsec tunnel and the second metric to the second IPsec tunnel, are to:

determine a first quality of service associated with the first IPsec tunnel;

assign the first metric to the first IPsec tunnel based on the first quality of service;

determine a second quality of service associated with the second IPsec tunnel; and assign the second metric to the second IPsec tunnel based on the second quality of service.

10. The first endpoint device of claim 7, wherein the one or more processors are further to:

transmit, to the second endpoint device, a first configuration payload for the first IPsec tunnel indicating the first metric and a second configuration payload for the second IPsec tunnel indicating the second metric.

11. The first endpoint device of claim 7, wherein the first metric comprises a first weight and the second metric comprises a second weight, and wherein the one or more processors are further to:

transmit, via the first IPsec tunnel, a first percentage of the data toward the second endpoint device, wherein the first percentage is determined based on the first weight; and transmit, via the second IPsec tunnel, a second percentage of the data toward the second endpoint device, wherein the second percentage is based on the second weight.

12. The first endpoint device of claim 11, wherein the one or more processors are further to:

determine the first weight based on a first bandwidth associated with the first IPsec tunnel; and determine the second weight based on a second bandwidth associated with the second IPsec tunnel.

13. The first endpoint device of claim 7, wherein the one or more processors, to assign the first metric to the first IPsec tunnel and the second metric to the second IPsec tunnel, are to:

transmit, to the second endpoint device, a first configuration payload for the first IPsec tunnel indicating the first metric and a second configuration payload for the second IPsec tunnel indicating the second metric;

receive a response to the first configuration payload, wherein the response indicates a new first metric associated with the first IPsec tunnel; and assign the new first metric to the first IPsec tunnel.

14. The device of claim 7, wherein the one or more processors are further to:

transmit a first configuration payload for the first IPsec tunnel indicating the first metric and a second configuration payload for the second IPsec tunnel indicating the second metric, wherein the first configuration payload and the second configuration payload include a new configuration payload type for an Internet key exchange (IKE) exchange message.

15. A non-transitory computer-readable medium storing a set of instructions, the set of instructions comprising:

one or more instructions that, when executed by one or more processors of a first endpoint device, cause the first endpoint device to:

assign a first metric to a first Internet Protocol security (IPsec) tunnel and a second metric to a second IPsec tunnel, wherein the first IPsec tunnel is a first communication channel for transmitting data between the first endpoint device and a second endpoint device and the second IPsec tunnel is a second communication channel for transmitting the data between the first endpoint device and the second endpoint device, and wherein the first IPsec tunnel and the second IPsec tunnel are from a plurality of IPsec tunnels between the first endpoint device and the second endpoint device;

rank, in response to comparing a first value of the first metric and a second value of the second metric, the plurality of IPsec tunnels;

select, according to the ranking, the first IPsec tunnel or the second IPsec tunnel as a selected IPsec tunnel for transmitting the data toward the second endpoint device;

modify, upon determining an issue associated with the first IPsec tunnel, the second metric to generate a modified second metric;

re-rank, according to the modified second metric, the plurality of IPsec tunnels;

select, in response to the re-ranking, a particular IPsec tunnel of the plurality of IPsec tunnels; and transmit the data toward the second endpoint device via the particular IPsec tunnel.

16. The non-transitory computer-readable medium of claim 15, wherein the one or more instructions further cause the first endpoint device to:

determine an issue associated with the first IPsec tunnel;

modify, based on the issue associated with the first IPsec tunnel, the second metric to generate a modified second metric; and select, based on comparing a value of the first metric and the modified second metric, the first IPsec tunnel or the second IPsec tunnel as a new selected IPsec tunnel for transmitting data toward the second endpoint device.

17. The non-transitory computer-readable medium of claim 16, wherein the one or more instructions further cause the first endpoint device to:

transmit a configuration payload indicating the modified second metric to the second endpoint device.

18. The non-transitory computer-readable medium of claim 15, wherein the one or more instructions, that cause the first endpoint device to assign the first metric to the first IPsec tunnel and the second metric to the second IPsec tunnel, cause the first endpoint device to:

determine a first quality of service associated with the first IPsec tunnel;

assign the first metric to the first IPsec tunnel based on the first quality of service;

determine a second quality of service associated with the second IPsec tunnel;

assign the second metric to the second IPsec tunnel based on the second quality of service; and transmit, to the second endpoint device, a first configuration payload for first IPsec tunnel indicating the first metric and a second configuration payload for the second IPsec tunnel indicating the second metric.

19. The non-transitory computer-readable medium of claim 15, wherein the first metric comprises a first weight and the second metric comprises a second weight, and wherein the one or more instructions further cause the first endpoint device to:

transmit, via the first IPsec tunnel, a first percentage of the data toward the second endpoint device, wherein the first percentage is determined based on the first weight; and transmit, via the second IPsec tunnel, a second percentage of the data toward the second endpoint device, wherein the second percentage is based on the second weight.

20. The non-transitory computer-readable medium of claim 19, wherein the one or more instructions further cause the first endpoint device to:

determine the first weight based on a first bandwidth associated with the first IPsec tunnel; and determine the second weight based on a second bandwidth associated with the second IPsec tunnel.

\* \* \* \* \*